United States Patent [19]
Shkolnik

[11] Patent Number: 4,862,980
[45] Date of Patent: Sep. 5, 1989

[54] WALKING MACHINE
[75] Inventor: Nikolay Shkolnik, Bloomfield, Conn.
[73] Assignee: Quest Systems, Inc., Bloomfield, Conn.
[21] Appl. No.: 254,435
[22] Filed: Oct. 6, 1988
[51] Int. Cl.$^4$ ............................................. B62D 57/02
[52] U.S. Cl. ..................................... 180/8.2; 180/8.1; 74/469; 101/23
[58] Field of Search .................. 180/8.1, 8.2, 8.3, 8.4, 180/8.5, 8.6, 8.7; 74/469; 901/21, 23, 24, 25

[56] References Cited

U.S. PATENT DOCUMENTS

| | | | |
|---|---|---|---|
| 3,269,478 | 8/1966 | Joslyn | 180/8.1 |
| 4,202,423 | 5/1980 | Soto | 180/8.2 |
| 4,265,326 | 5/1981 | Lauber | 180/8.1 |
| 4,500,251 | 2/1985 | Kiry et al. | 901/21 |
| 4,502,566 | 3/1985 | Bartholet | 180/8.1 |
| 4,503,924 | 3/1985 | Bartholet et al. | 180/8.1 |
| 4,600,355 | 7/1986 | Johnson | 901/21 |
| 4,662,465 | 5/1987 | Stewart | 180/8.1 |
| 4,728,252 | 3/1988 | Lada et al. | 901/23 |
| 4,749,330 | 6/1988 | Hine | 74/469 |

FOREIGN PATENT DOCUMENTS

61-139567  6/1986  Japan ..................... 180/8.2

Primary Examiner—Charles A. Marmor
Assistant Examiner—Donn McGiehan
Attorney, Agent, or Firm—Robert H. Montgomery

[57] ABSTRACT

A vehicle with a plurality of legs which selectively alternately support and advance the vehicle in horizontal straight line motion, each of the legs comprises a support member, and in one embodiment, a first gear nonrotatively affixed to the support member, a first link pivotally connected to the support member at one end thereof, a means for rotatably driving the link about the pivotal connection, an idler gear pivotally mounted to the first link intermediate the ends thereof and in driving engagement with the first gear, a second link pivotally connected at one end thereof to the first link at the second end thereof, the second link having a planet gear affixed thereto and engaging the idler gear, whereby when the first link is pivotally driven by the drive means through the idler gear and the planet gear produces angular motion of the second link about the pivotal connection between the links, the first link is constructed and arranged to limit the angular movement of said second link in either direction, the support members are selectively vertically movable on the vehicle body to alternately allow the legs to contact the ground and move the vehicle body and to rise and permit the legs to be pivoted to a position for further movement of the vehicle body when the legs are again lowered to contact the ground. In alternate embodiments, the gears may be replaced with a wheel and cable drive system, or a sprocket and chain system which does not require an idler.

16 Claims, 5 Drawing Sheets

WALKING MACHINE

FIELD OF THE INVENTION

This invention relates to vehicles, sometimes referred to as "walking machines" and, more particularly, to a leg mechanism for such vehicles.

BACKGROUND OF THE INVENTION

At the present time in the development of mobile systems, locomotion is primarily achieved through the use of wheels or tracks. Wheeled vehicles are in an advanced state of development for locomotion on flat prepared surfaces. However, mechanical means for off road locomotion have not been perfected to a comparable degree. Locomotion based on the use of wheels is most effective on prepared surfaces and degrades rapidly when soft soil or rough uneven terrain is encountered.

The use of tracked vehicles partially solves this problem for outdoor locomotion, but to a lesser degree than it is generally assumed. Specifically, only about fifty percent of the land surface is acceptable to track vehicles, while nearly all the land surface of the earth is freely traversed by large animals. Moreover, on terrain on which track vehicles can be used, animals are typically capable of considerably more speed at a greatly reduced energy cost. It has been determined that the reason for the superior performance of animals in off road locomotion lies in the adaptive nature of leg locomotion. One leading expert in the field has observed that while the number of experimental leg vehicles have demonstrated terrain adaptability and mobility comparable to animals of similar size, the energy efficiency of these vehicles is very low, even in comparison with tracked vehicles, and at least two orders of magnitude inferior to the performance of animals in comparable terrain.

Various types of vehicles with artificial legs have been proposed for off road vehicles. All such legged vehicles thus far known have not been known to be energy efficient. The legged vehicles generally comprise a vehicle body with a plurality of legs in which some are lifted during a step or sequence of motion to be advanced and support the vehicle or vehicle platform as it is advanced by the legs contacting the ground.

It is important that the movement and motion of the legs, impart only what is referred to as "straight line" motion to the vehicle body. Otherwise, the vehicle will be subjected to vertical motion.

Accordingly, the present invention provides a new and improved walking leg mechanism for a walking vehicle which provides for straight line motion of the vehicle, while being very energy efficient.

SUMMARY OF THE INVENTION

Briefly stated, the invention, in one form thereof, comprises a vehicle with a plurality of legs which selectively alternately support and advance the vehicle in horizontal straight line motion. Each of the legs comprises a support member which is vertically movable on the vehicle between upper In the lower position, a foot on the leg member is in contact with the ground. In an upper position, the leg is repositioned to again move the vehicle in horizontal straight line motion when it is again lowered to the ground. In one embodiment, a first gear is nonrotatively affixed to the support member and a first link is pivotally connected to the support member at one end thereof. A drive means is provided for rotatively driving the first link about the pivotal connection thereof to the support member. An idler gear is pivotally mounted to the first link intermediate the ends thereof and is in driving connection with the first gear, a second link is pivotally connected at one end thereof to the first link at the second end of the first link. The second link has a planet gear nonrotatively affixed thereto and engaging the idler gear, whereby when the first link is pivotally driven by the drive means, the first link through the idler gear and the planet gear produces angular motion of the second link about the pivotal connection between the first and second links. The first link is constructed and arranged to limit the angular movement of the second link in either direction.

The first gear and the idler gear may have aspheric surfaces in order to achieve exact straight line horizontal motion of the vehicle body.

In an alternate arrangement, the gears may be replaced by a wheel and cable system. The idler gear or wheel may be eliminated if the gearing system is replaced by a chain and sprocket system or wheel and cable system, as will be described.

The legs are arranged to move vertically on the vehicle body so that they may be raised and angularly repositioned for a succeeding step. An object of this invention is to provide a walking machine having new and improved legs which provide horizontal straight line movement of the vehicle body.

Another object of this invention is to provide a new and improved linkage mechanism which is useful in a walking machine to provide straight line horizontal motion of the vehicle body.

A further object of this invention is to provide a walking vehicle with legs of the type described, which are very energy efficient.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF THE PREFERRED EMBODIMENTS

Figure 1:
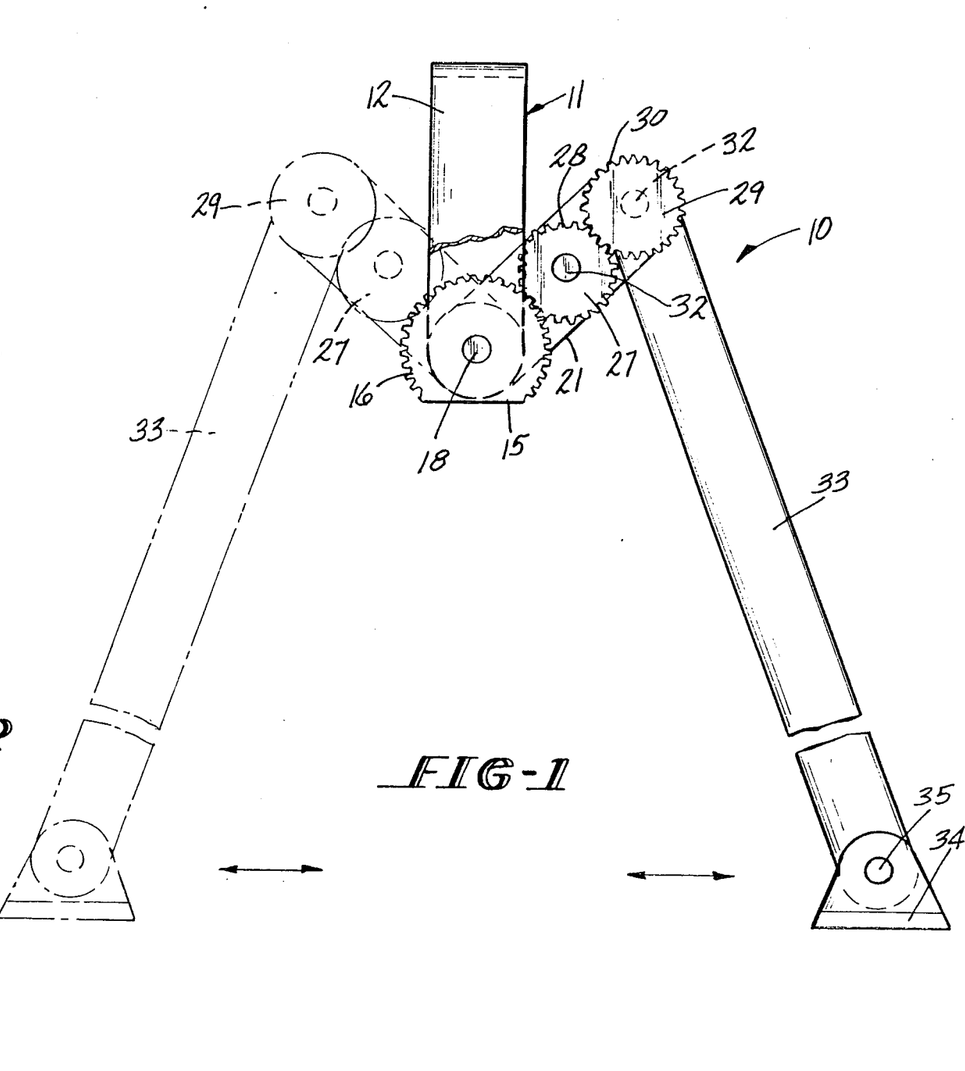
FIG. 1 is a side elevation of a mechanism embodying the invention, showing a portion of the mechanism in two operative positions, one in broken line.
Figure 2:
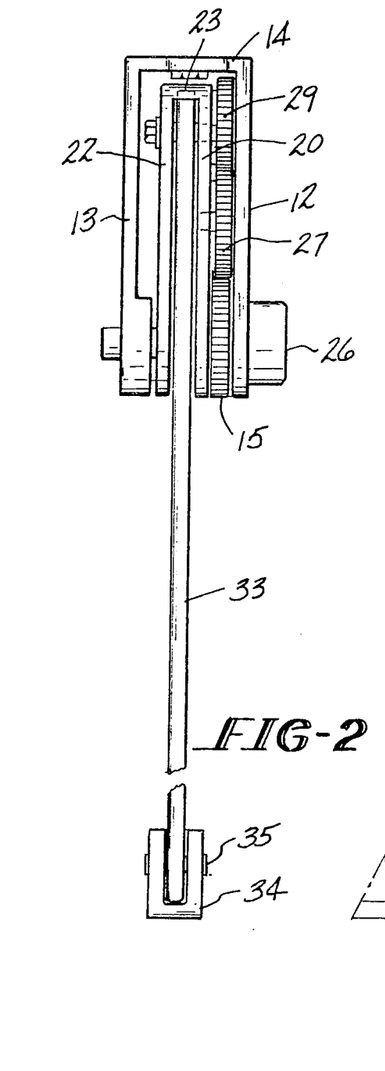
FIG. 2 is a view seen from the left-hand side of FIG. 1 when the supporting link of the mechanism of FIG. 1 is in a vertical position.
Figure 3:
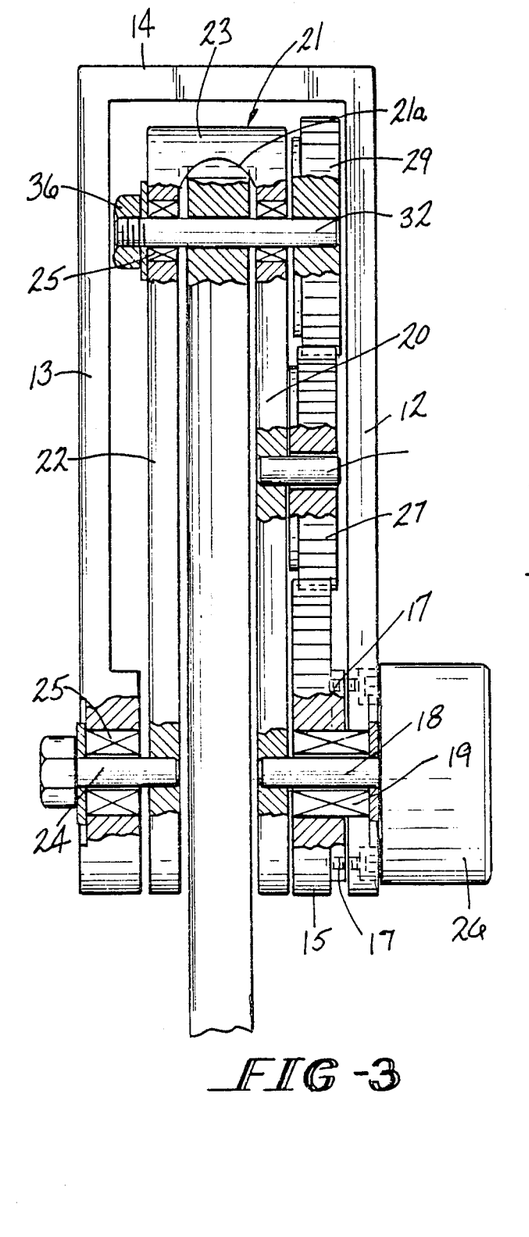
FIG. 3 is an enlarged view of a portion of FIG. 2 partially cut away, and showing constructional features in more detail.

A basic mechanism embodying the invention is shown in FIGS. 1-3. This mechanism 10, while designed to have straight line motion in a walking machine, may have other applications as will hereinafter be made apparent.

The mechanism 10 comprises a generally inverted U-shape support member or cage 11 having downwardly extending legs 12 and with an upper joining member 14. A gear or guide member 15 having teeth 16 is fixedly secured to leg 12 as by means of bolts or screws 17 (FIG. 3). Gear 15 is termed a guide member since it provides a path or guide for an idler gear 27, hereinafter described, about a path which may be aspheric. A rotatable shaft 18 is received in a bearing 19 and is fixed into one leg 20 of a link 21 having a second leg 22. An upper portion 23 joins legs 20 and 22. In FIG. 1 leg 22 is removed for clarity of illustration, and leg 12 of support member 11 is partially cut away.

Leg 22 of link 21 is connected to a shaft 24 fixed in gear 29, and shaft 24 is journaled in a bearing 25 carried in leg 22 of link 21.

Link 21 is arranged to be rotatively driven through shaft 18 by a reversible drive motor 26 connected to shaft 18. Thus, drive motor 26 may move link 21 from the full line position shown in FIG. 1 to the broken line position, and vice versa. There are stops 21a on link 21, which limit the extent of the angular motion of link 33 in either direction.

An idler gear or member 27 having teeth 28 is rotatably mounted to leg 20 of link 21 by a shaft 29 received in leg 20, and meshes with the teeth 16 of gear 15. As link 31 is rotated, idler gear moves along the teeth of guide gear 15 and is rotated thereby.

As thus far described, drive motor 26 will rotate shaft 18, which will in turn rotate link 21. This will impart rotary motion to idler gear 27 as it is guided and rotates about gear 15.

Idler gear 27 meshes with another gear or member 29, which will be termed a planet gear or member, having teeth 30 which mesh with teeth 28 of idler gear 27. Gear 29 is affixed to shaft 32. The upper end of a second longer link 33 is also affixed to shaft 32, and will pivot as planet gear 29 is driven through idler gear 27. The lower end of the second link 33 is pivotally connected to a foot member 34 at pivot point 35.

Thus, gear 29 is affixed to and is non-rotatable with respect to the upper end of link 33. A lock nut 36 is secured to a threaded end of shaft 32.

With the construction thus far described, when shaft 18 is rotated counterclockwise by motor 26, link 21 will so rotate. Idler gear 27 will rotate around gear 15, and will rotate planet gear 29 in a clockwise direction as seen in full line in FIG. 1.

The relationship of idler gear 27 to planet gear 29 will cause link 33 to move from the solid line position of FIG. 1 to the broken line position of FIG. 1.

In a walking machine, this motion will take place when the mechanism 10 is elevated above the ground. As will hereinafter be described, the reverse motion will take place from the broken line position of FIG. 1 to the full line position of FIG. 1 when the mechanism 10 has foot 34 on the ground to propel a vehicle forward.

As is hereinafter described, a walking machine or vehicle is equipped with a plurality of mechanisms 10, all of which are vertically movable to both support the vehicle and advance (or retract) the vehicle. Some of the legs of mechanisms will be on the ground to support and advance the vehicle while others have been raised and repositioned for the next stop or movement.

Figures 4, 5, 7:
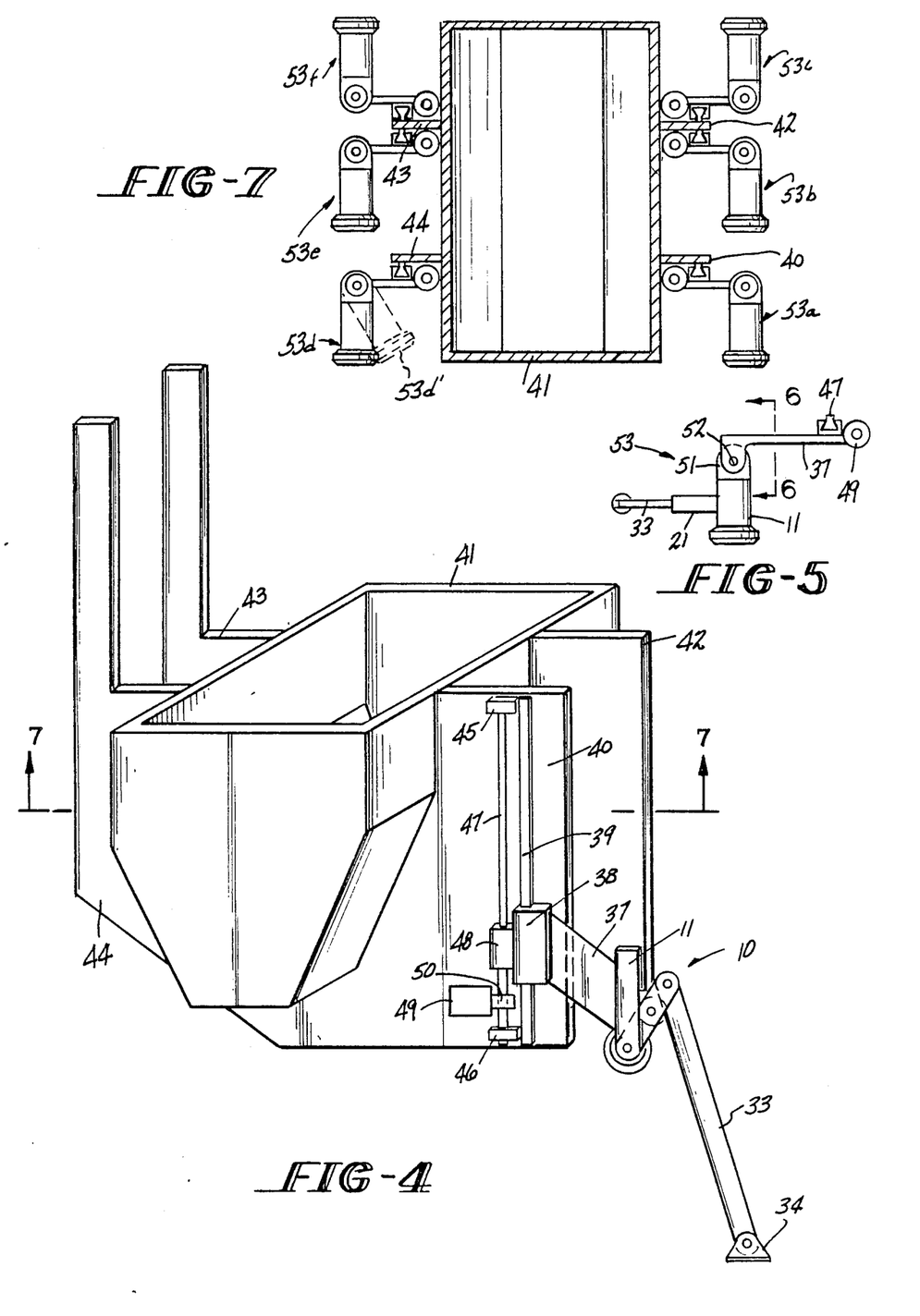
FIG. 4 is a perspective view of a vehicle body utilized in the invention.
FIG. 5 is a top view of the leg mechanism of FIG. 4.
FIG. 7 is a top plan view of mechanism of FIG. 1.

Reference is now made to FIG. 4 which illustrates a vehicle body with one leg mechanism 10 thereon and FIG. 7 which illustrates a vehicle body with six leg mechanisms thereon. Support member 11 has attached thereto an adaptor member 37 which in turn is attached to a slide 38 on a vertical rail 39. Rail 39 is mounted to a support member 40 on vehicle body 41. There are also other support members 42, 43 and 44 extending from vehicle body 41.

Also mounted to support 40 in bearings 45 and 46 is a lead screw 47 which is engaged by a ball nut 48 mounted to slide 38. Lead screw 47 is driven by a motor 49 having a coupling 50 to lead screw 47. Upon rotation of lead screw 47 a mechanism 10 will be raised or lowered dependent upon the direction of rotation.

As shown in FIG. 4, the leg mechanism 10 has moved to a rearward position in which it has completed a propulsion step to move body 41 forward (left as viewed in FIG. 4). As shown in FIG. 4, leg mechanism 10 is on the ground and is in a position corresponding to that shown in full line in FIG. 1 and will now be raised and moved to the position shown in broken line in FIG. 1. Thereafter it will be lowered and move in a propulsion step back to the position shown in FIG. 4.

The support members 43 and 44 extend above vehicle body 41 to permit the legs on one end of the vehicle to be raised to climb stairs or to navigate a grade while maintaining vehicle body 41 horizontal. This also permits descent of the vehicle down stairs or a grade.

Reference is now made to FIG. 5 which is a top view of the leg 10 of leg mechanism 10 of FIG. 4. Adaptor 37 is pivotally connected to a support member 11 through a clutch 51 as exemplified by the connection 52. The entire assembly of FIG. 5 will be represented by the reference numeral 53.

Figure 6:
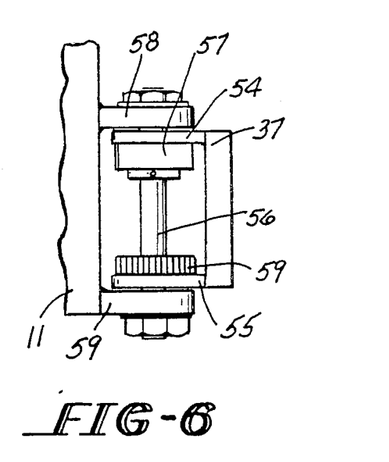
FIG. 6 is a view seen in the plane of lines 6—6 of FIG. 5.

Reference is now made to FIG. 6. Adaptor member 37 is secured to an upper member 54 and a lower member 55 which are fast on a shaft 56 which extends into an electromagnetic clutch 57. Shaft 56 is rotatable in upper and lower brackets 58 and 59, which are welded to support member 11.

A torsion spring 59 is connected to shaft 56 and also to adaptor member 37. The purpose of the torsion spring 59 is to return shaft 56 to a normal position when clutch 57 is energized. Normally clutch 57 is not energized when the clutching elements are in engagement, and adaptor 37 is rigid with respect to support member 11.

When it is desired to turn the vehicle, the electromagnetic clutch is energized, disengaging the clutching elements and then adaptor 37 with the leg mechanism 10 thereon is free to turn. Turning is accomplished by varying the speeds of the legs on either side of the vehicle body 41. Thus, when a turn is desired, the clutch on the side of the turn is disconnected, permitting the leg mechanism 10 to turn on pin 56, as the speed of the legs on the other side is increased with respect to the speed of the legs on the side in the direction of turn.

Reference is now made to FIG. 7 which is a plan view in section of vehicle body 41 with six of the leg mechanisms attached thereto. The leg mechanisms are identified by the reference numerals 53a, 53b, 53c, 53d, 53e and 53f.

Leg mechanisms 53a–53f are shown without the links 32 and 33 thereon. As shown, two of the mechanisms are attached to each of support members 42 and 43. However, dependent on the width of the vehicle body 41, additional support members could be provided, namely, six, so that each of the mechanisms 53 would have an individual support.

In one mode of operation, the mechanisms 53b, 53d, and 53f would be on the ground at one time, propelling the vehicle, while alternately, the mechanisms 53a, 53c and 53e would be on the ground while the other three mechanisms were elevated to move to a position where, upon depression to ground contact, they would be the propelling mechanisms while 53a, 53c and 53e were raised for a further propelling motion.

The mechanism 53d is also shown in broken outline as 53d' to show its position in a pivoted condition when the electromagnetic clutch 57 associated therewith is deenergized to permit pivotal movement. It will be understood that the vehicle is movable in either direction, either upon a level surface or to climb a grade or stairs or to descend a grade or stairs.

This is the reason for the ability of the mechanisms 53d–53f to be elevated on supports 43 and 44, so as to navigate uneven grades or stairs in either direction.

Figures 8, 10:
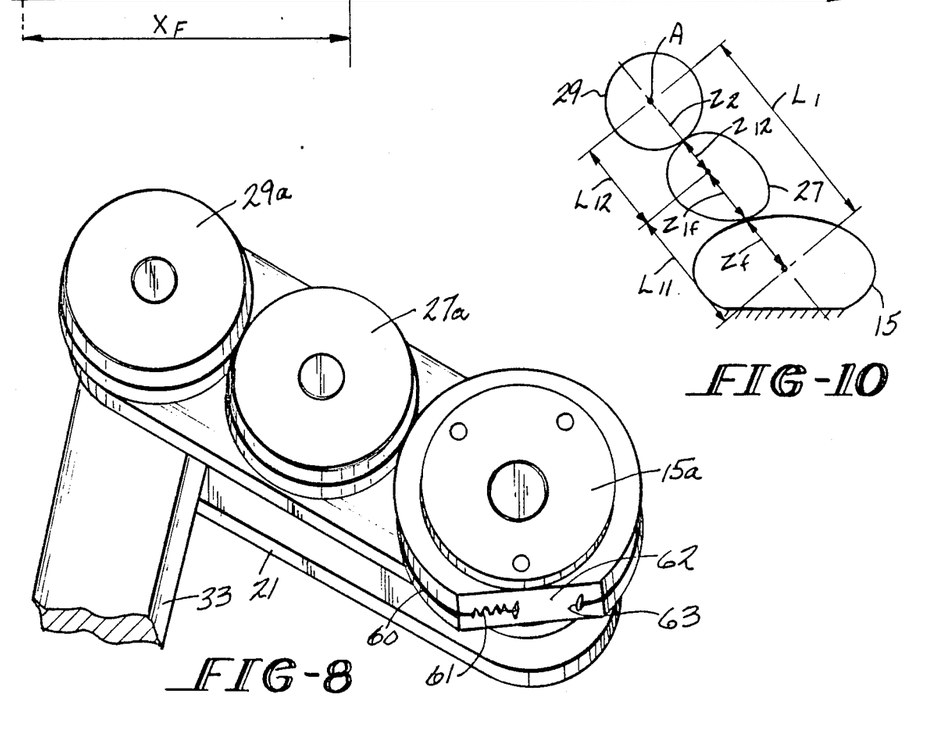
FIG. 8 is a fragmentary perspective view of another embodiment of the invention.
FIGS. 9 and 10 are schematic linkage diagrams helpful in a mathematical analysis of the system.

FIG. 8 exemplifies an alternate embodiment of the invention wherein the gears 15, 27 and 29 are replaced by wheels 15a, 27a and 29a, together with one or more cables 60 reversely wrapped around the wheels and having ends anchored to the fixed guide member 15a. In this construction, the wheels are not in contact but have slight clearance therebetween to provide clearance for the cable 60. One end of cable 60 is anchored to wheel 15a through a spring 61, while the other end of cable 60 is also anchored to a flat portion 62 of wheel 15a at 63. In this construction, the wheels 27a and 29a are carried on link 21 and wheel 29a is fast with link 33. This construction is the same as previously described, with the exception of the use of the wheels 15a, 27a and 29a instead of the meshing gear teeth of the gears 15, 27 and 29.

While the arrangement shown in FIG. 8 shows the wheels 15a, 27a and 29a being outside of the link 21, such wheels may be positioned inside as exemplified by the corresponding gears in FIGS. 1 and 2.

The mechanism thus far described will produce substantially straight line (horizontal motion of the housing 11 as the link 33 pivots or moves from the position shown in broken line in FIG. 1 to the position shown in full line in FIG. 1, while foot 34 is on the ground. This is assuming that housing 11 is in fixed position on a vehicle body.

Straight line motion may be achieved by forming portions of the gears 15 and 27 with aspheric surfaces, as shown by the following mathematical analysis.

Figure 9:
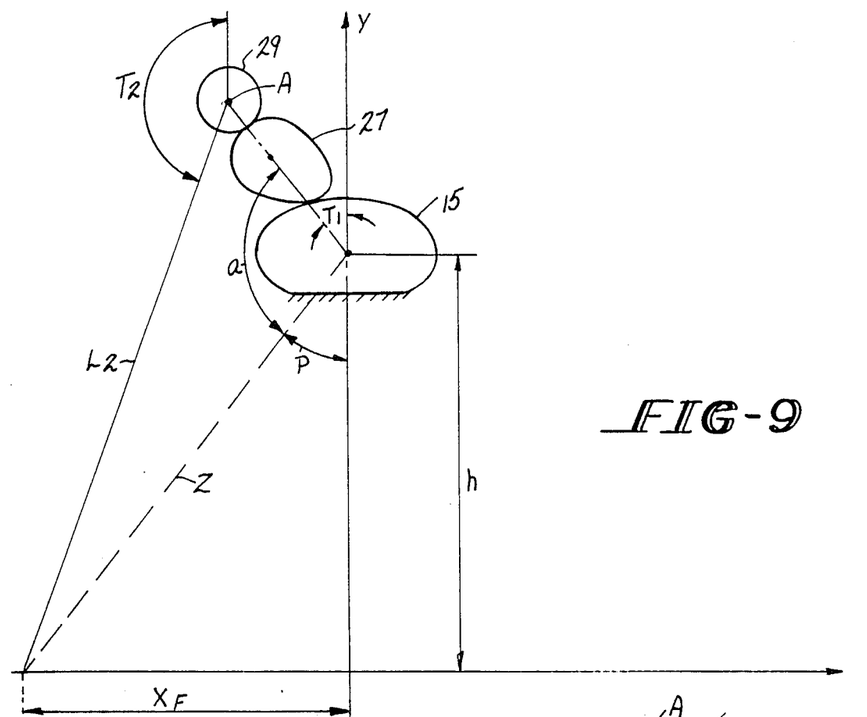

Reference is now made to FIGS. 9 and 10 which are schematic diagrams set forth for purposes of explaining the operation of a mechanism embodying the invention. The aspheric edges of members 15 and 27 are exaggerated. As previously explained, the circular planet gear 29 is fixed to link 33.

The circular position of idler gear 27 is indicated by the reference numeral 40 and the aspheric or non-circular portion of idler gear 27 is indicated by the reference numeral 41. In the following equations, the effective length of link 21 is identified as $L_1$ and effective length of link 33 is identified as $L_2$:

$$P = \arctan\left(-\frac{X_F}{h}\right) \quad (1)$$

$$Z = \sqrt{X_F^2 + h^2} \quad (2)$$

$$T_1 = S(\pi - a - |P|) \quad (3)$$

where $$S = 1 \text{ for } X_F \leq 0$$

$$S = -1 \text{ for } X_F > 0$$

$$T_2 = S \arccos\left(\frac{-h + L_1 \cos T_1}{L_2}\right) \quad (4)$$

$$a = \arccos\left(\frac{L_1^2 + Z^2 - L_2^2}{2 \cdot L_1 \cdot Z}\right) \quad (5)$$

Reference is now made to FIG. 10 which schematically exemplifies the gears 15, 17, and 29, and consider:

$Z_f$ = the instantaneous radius of contact of gear 27 on gear 15.

$Z_{1f}$ = the instantaneous radius of contact of idler gear 27 with fixed gear 15.

$Z_{12}$ = the constant radius of contact of idler gear 27 with the planet gear 29.

$Z_2$ = the constant radius of planet gear 29.

$W_1$ = angular velocity of link $L_1$.

$W_2$ = angular velocity of link $L_2$.

$W_i$ = angular velocity of idler gear 27.

then $$W_i = W_1 \frac{L_{11}}{Z_{1f}} \quad (6)$$

$$\frac{W_1}{W_i} = \frac{dT_1}{dT_i} = \frac{Z_{1f}}{L_{11}} \quad (7)$$

The linear velocity $V_A$ at point A is:

$$V_A = W_1 \cdot L_1 = W_i(Z_{12} + Z_{1f}) + W_2 \cdot Z_2 \quad (8)$$

$W_2$ can be found from the requirement that point F moves along a straight line, that is, $y = -h$. This leads to:

$$-L_2 \cos T_2 = h + L_1 \cos T_1 \quad (9)$$

or $$\cos T_2 = \frac{-h + L_1(\cos T_1)}{L_2} \quad (10)$$

Differentiating (10) gives:

$$dT_2 = \frac{-L_1}{L_2} \cdot \frac{\sin T_1}{\sin T_2} \cdot dT_1 \quad (11)$$

Denoting:

$$f(T_1) = \frac{1}{\sqrt{1 + \frac{2h}{L_1(1 + \cos T_1)}}} \quad (12)$$

We get:

$$W_2 = -f(T_1) W_1 \quad (13)$$

-continued
where $$W_2 = \frac{dT_2}{dt}$$

$$W_1 = \frac{dT_1}{d_2}$$

Substituting (13) into (8) gives:

$$Z_{1f} = \frac{L_{11} \cdot Z_{12}}{L_{12} + f(T_1) Z_2} \quad (14)$$

Also from FIG. 10:

$$Z_f = L_{11} - Z_{1f} \quad (15)$$

or $$Z_f = L_{11} \left( 1 - \frac{Z_{12}}{L_{12} + f(T_1) Z_2} \right) \quad (16)$$

from (16)

$$Z_f = Z_f(T_1) \quad (17)$$

which is a parametric form of a non-circular profile of the fixed gear 15.

By choosing a properly dimensional geometry of linkages $h_1$, $L_1$, $L_2$, $Z_f$, $Z_1$ and $Z_2$, circular gears can be substituted for non circular gears. A trade off will be slight deviation of straight line motion of point F.

For example, with the following linkage dimensions:
h=12.75″
$L_1$=4.5″
$L_2$=h+$L_1$=17.25″
$Z_f$=1.5″
$Z_1$=$Z_{12}$=$Z_{1f}$1.0″
$Z_2$1.0″ gives a deviation of only=0.015″ from y=−h over a 20″ step size.

In the embodiment shown, FIGS. 1-3 and FIG. 8, the idler gear 27 and the idler wheel 27a are utilized primarily for a change in direction. In other embodiments, an idler member is not required.

Figure 11:
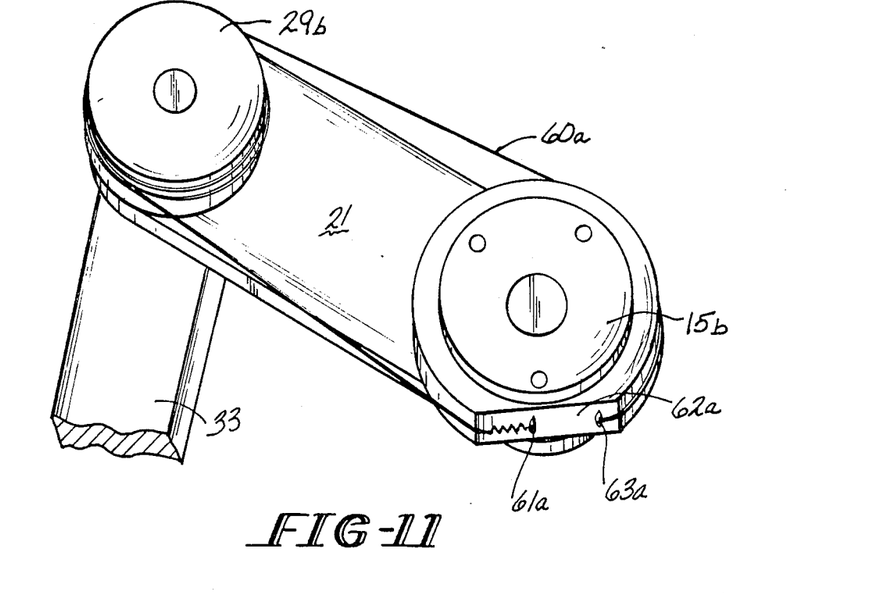
FIGS. 11 and 12 are views partially cut away of other embodiments of the invention.

Reference is now made to FIG. 11 which shows a wheel and cable drive where a cable 60a has its ends 61a and 63a attached to a flat 62a on guide wheel 15b. Cable 60a is wrapped several times around a planet wheel 29b. As before, the guide member 15b is fast with a support member (not shown in FIG. 11), and link 21 is driven by a motor 26, as previously described.

Figure 12:
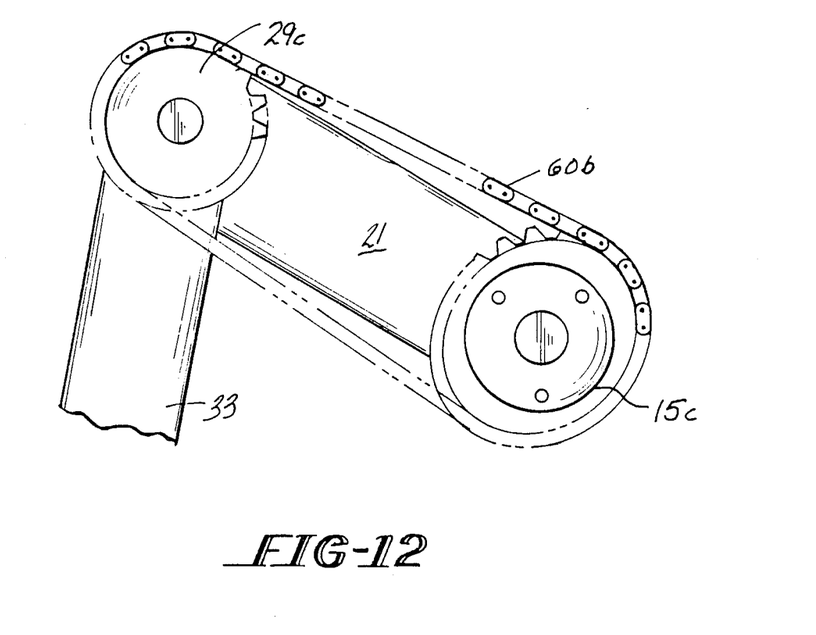

FIG. 12 shows another embodiment of the invention where the guide member is a sprocket 15c which is fixedly attached to a support member (not shown in FIG. 12) and receives a chain 60b which also engages planet sprocket 29c, which is fixed with respect to link 33.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A mechanism comprising a support member, a guide member nonrotatively affixed to said support member, a first link pivotally connected to said support member at one end of said link, means for rotatably driving said link at said one end thereof, an idler member pivotally mounted to said first link intermediate the ends thereof and adapted to be guided by said guide member, a second link pivotally connected at one end thereof to said first link at the second end thereof, said second link having a planet member affixed thereto and arranged to be driven by said idler member, whereby when said first link is pivotally driven by said means at said one end thereof said first link through said idler member and said planet member produces angular motion of said second link about the pivotal connection between said links.

2. The mechanism of claim 1, where said support member is of generally inverted U-shape having two legs, said guide member is attached to the lower end of one leg of said support member and said first link is pivotally attached to said one leg through said guide member, and said planet member is affixed to said second link on a pin which provides the pivotal connection between said links.

3. The mechanism of claim 1, where said first link is of generally inverted U-shape having two legs, said second link pivoting between said two legs.

4. The mechanism of claim 1, where said guide member and said idler member are aspheric.

5. The mechanism of claim 1 where said first link is constructed and arranged to limit the angular movement of said second link.

6. The mechanism of claim 1 where said guide member, said idler member and said planet member are interconnected by one or more cables anchored at both ends to said guide member and reversely wrapped around said idler member and said planet member.

7. The mechanism of claim 1 wherein said guide member, said idler member and said planet member are meshing gears.

8. A mechanism comprising a support member, a first link pivotally connected to said support member at one end of said link, means for rotatably driving said link at said one end thereof, a guide member nonrotatively affixed to said support member, a second link pivotally connected at one end thereof to said first link at the second end thereof, said second link having a planet member affixed thereto, means connecting said guide member and said planet member, whereby when said first link is pivotally driven by said means at said one end thereof said first link through said means connecting and said planet member produces angular motion of said second link about the pivotal connection between said links.

9. The mechanism of claim 8, where said support member is of generally inverted U-shape having two legs, said guide member is attached to the lower end of one leg of said support member and said first link is pivotally attached to said one leg through said guide member, and said planet member is affixed to said second link on a pin which provides the pivotal connection between said links.

10. The mechanism of claim 8, where said first link is of generally inverted U-shape having two legs, said second link pivoting between said two legs.

11. The mechanism of claim 8, where said guide member is aspheric.

12. The mechanism of claim 8 where said first link is constructed and arranged to limit the angular movement of said second link.

13. The mechanism of claim 8 where said guide member and said planet member are interconnected by one or more cables anchored at both ends to said guide member and contacting the aspheric portion thereof and wrapped around said planet member.

14. The mechanism of claim 8 where said guide member and said planet member are sprockets and a chain interconnects said members.

15. A walking machine comprising a vehicle body, a plurality of leg mechanisms on said vehicle body, each of said leg mechanisms comprising a first link pivotally connected to said support member at one end of said link, means for rotatably driving said link at said one end thereof, a guide member nonrotatively affixed to said support member, a second link pivotally connected at one end thereof to said first link at the second end thereof, said second link having a planet member affixed thereto, means connecting said guide member and said planet member, whereby when said first link is pivotally driven by said means at said one end thereof said first link through said means connecting and said planet member produces angular motion of said second link about the pivotal connection between said links, means mounting the support members of said leg mechanisms for vertical movement on said vehicle body, and drive means for raising and lowering said support members.

16. The walking machine of claim 15 where the means mounting each of said support means includes a clutch which is releasable to permit said support members to pivot about a vertical axis.

* * * * *